United States Patent [19]

Oetiker

[11] Patent Number: 4,712,278
[45] Date of Patent: Dec. 15, 1987

[54] EARLESS CLAMP STRUCTURE

[76] Inventor: Hans Oetiker, Oberdorfstrasse 21, CH-8810 Horgen 2, Switzerland

[21] Appl. No.: 921,411

[22] Filed: Oct. 22, 1986

[51] Int. Cl.4 .............................................. B65D 63/02
[52] U.S. Cl. .................................. 24/20 TT; 24/20 W; 24/23 EE
[58] Field of Search ............... 24/20 R, 20 TT, 20 W, 24/20 CW, 20 EE, 19, 279, 703

[56] References Cited

U.S. PATENT DOCUMENTS

| | | | |
|---|---|---|---|
| 3,286,314 | 11/1966 | Oetiker | 24/20 CW |
| 3,358,351 | 12/1967 | Ott | 24/23 EE |
| 4,299,012 | 11/1981 | Oetiker | 24/20 W |
| 4,315,348 | 2/1982 | Oetiker | 24/279 |
| 4,492,004 | 1/1985 | Oetiker | 24/20 W |
| 4,622,720 | 11/1986 | Oetiker | 24/20 TT |

Primary Examiner—Victor N. Sakran
Attorney, Agent, or Firm—Paul M. Craig, Jr.

[57] ABSTRACT

A clamp structure, especially for use in applications in which space conditions do not permit any projecting parts such as plastically deformable ears; to permit the use of conventional pliers, the tool-engaging surfaces in the inner band portion are formed by two tab-like members pressed-out of the inner band material which engage in an aperture of the outer band material that is also provided with its own tool-engaging surface in the form of a cold-deformed embossment pressed-out of the outer band portion.

21 Claims, 7 Drawing Figures

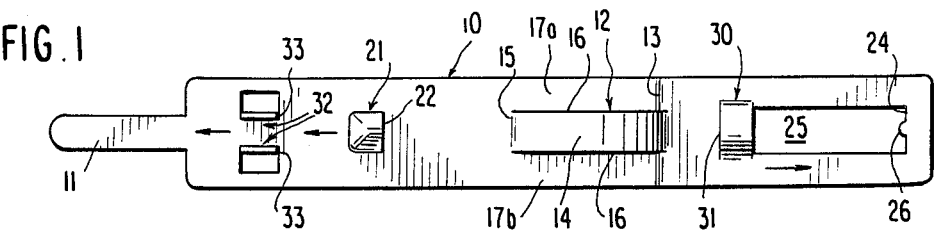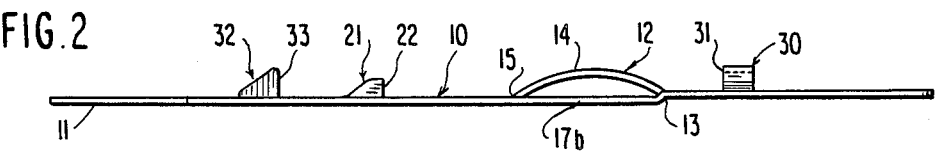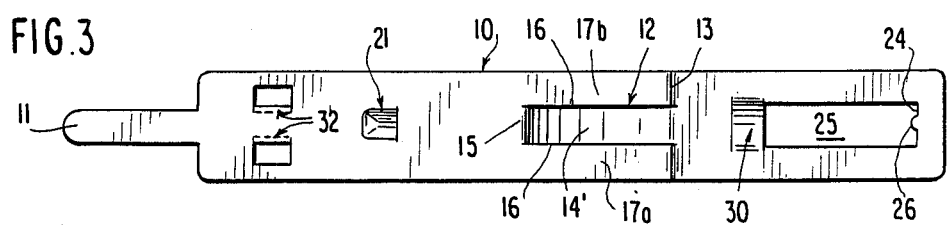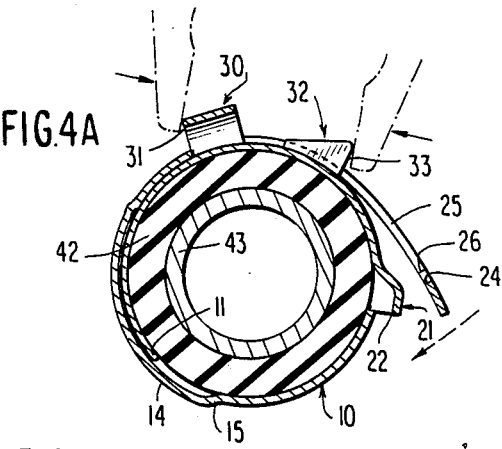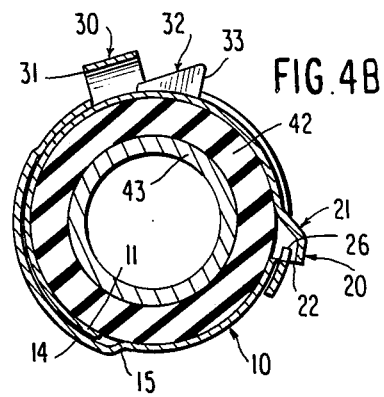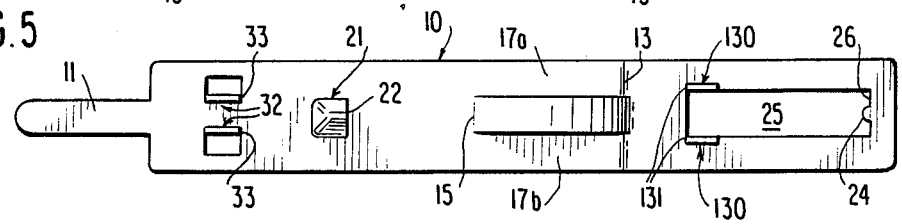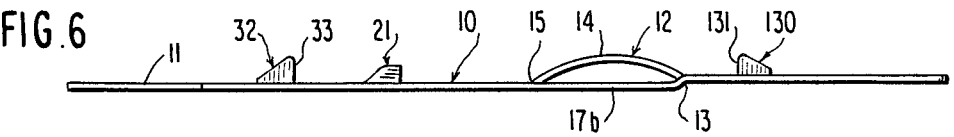

EARLESS CLAMP STRUCTURE

The present invention relates to an earless clamp structure of the open type, especially for use in applications in which space conditions do not permit any projecting parts, such as, plastically deformable ears and in which the overlapping band portions are interconnected by mechanical connecting means in the installed condition.

BACKGROUND OF THE INVENTION

Plastically deformable ears of the type which have become known as "Oetiker" ears have been used heretofore with great success and in a variety of different clamp structures, as disclosed, for example, in my prior U.S. Pat. Nos. 2,614,304; 3,082,498; 3,465,793, 3,523,337 and 3,510,918. However, in certain applications, space conditions do not permit any projecting parts such as plastically deformable ears, and therefore require earless clamp structures. My prior U.S. Pat. No. 4,492,004 describes an earless clamp structure which has proved highly successful. In the earless clamp structure as disclosed in this patent, outwardly extending embossments 24 and 25 are provided which are pressed out of the band material and are of at least partially cylindrical shape. Because of space requirements, these embossments must be relatively low in height and therefore require special tools provided with pointed tips for engagement into the openings formed by the embossments. Apart from the costs involved in making such special tools, they additionally entail the disadvantage that their life expectancy is limited due to wear and/or breakage of the tips.

Furthermore, there are limitations on the height, particularly with respect to the inner embossment 25 because this embossment must be able to extend through the slot 27 so that a limited amount of material is available for deformation which in turn limits the height of the embossment of the inner band portion if a certain thickness and therewith strength of the embossment is to be preserved.

OBJECT OF THE INVENTION

Accordingly, it is a principal of the present invention to provide a clamp structure of the earless type which avoids by simple means the aforementioned shortcomings and drawbacks encountered in the prior art and which can be tightened by the use of conventional pincers or pliers.

SUMMARY OF THE INVENTION

The underlying problems are solved according to the present invention in that the tool-engaging surfaces on the inner band portion are formed by tab-like means which extend substantially in the longitudinal direction of the clamp structure and are pressed out of the band material of the inner band portion. The tool-engaging surfaces are thereby formed on the side of the tab-like means opposite the free end of the inner band portion. These tab-like means are of such shape and so located in the inner band portion as to be able to extend through an aperture provided in the outer band portion near the opposite end thereof, when the clamping band is in its installed condition with the inner and outer band portions overlapping. In a preferred embodiment of the present invention, the tab-like means are formed by two tab-like members which are spaced from one another in the transverse direction by a distance at most approximately equal to the width of the aperture. The tab-like members are thereby so pressed-out of the band material that the openings left in the band material are thereby located between a respective tab-like member and the corresponding longitudinal side of the clamping band.

In the preferred embodiment of the present invention, the tab-like members are located symmetrically with respect to the longitudinal center of the clamping band so that at least nearly equal amounts of band material are left on each side. The tab-like members are thereby of at least approximately triangular shape as viewed in the axial direction of the clamp structure.

The tool-engaging surfaces in the outer clamp portion are in the form of an outwardly extending embossment forming a longitudinally extending tunnel as in my prior U.S. Pat. 4,492,004. However, as an alternative, the tool-engaging surfaces in the outer band portion may also be formed by tab-like members similar to those used in the inner band portion.

The clamp structure in accordance with the present invention may also be provided with appropriate means to avoid any step or discontinuity along the inner object-engaging surfaces of the clamp structure, particularly when used with thinner and harder plastic materials. These means may be as disclosed in my prior U.S. Pat. Nos. 4,299,012 and 4,315,348 and include a tongue-like extension at the free end of the inner band portion which is adapted to engage in a tongue-receiving channel formed as disclosed in the two last-mentioned patents.

The mechanical connection is established by at least one cold-deformed support hook as disclosed in my prior U.S. Pat. No. 4,299,012. To center and guide the outer band portion relative to the inner band portion, a small projection may be provided in the center of the side of the aperture nearest the end of the outer band portion which is adapted to engage underneath the cold-deformed pressed-out support hook when the clamp is tightened.

DESCRIPTION OF THE VARIOUS VIEWS

These and other objects, features and advantages of the present invention will become more apparent from the following description when taken in connection with the accompanying drawing which shows, for purposes of illustration only, two embodiments in accordance with the present invention, and wherein:

FIG. 1 is a top plan view on a clamp structure in accordance with the present invention;

FIG. 2 is a side elevational view of the clamp structure of FIG. 1;

FIG. 3 is a bottom plan view on the clamp structure of FIG. 1;

FIG. 4A is a cross-sectional view, at right angle to the axial direction of the clamp structure as it is being installed to tighten a hose onto a nipple;

FIG. 4B is a cross-sectional view, similar to FIG. 4A, and illustrating the clamp structure in the installed, tightened condition;

FIG. 5 is a plan view on a modified embodiment of a clamp structure in accordance with the present invention; and FIG. 6 is a side elevational view of the clamp structure of FIG. 5.

DESCRIPTION OF THE INVENTION

Referring now to the drawing wherein like reference numerals are used throughout the various views to designate like parts, and more particularly to FIGS. 1 to 3, a clamping band generally designated by reference numeral 10 includes at its one end a tongue-like extension 11 adapted to engage in a tongue-receiving means generally designated by reference numeral 12 which is formed by a step 13 in the outer band portion and a pressed-out band portion 14 in the center of the outer band portion effectively forming a channel 14' (FIG. 3) which extends from the area of the step 13 to a second step 15. Cuts 16, which may also be intermittent cuts, permit the band portion 14 to be pressed-out in such a manner as to leave non-pressed-out portions 17a and 17b on both sides thereof. The tongue-like extension 11 and tongue-receiving means 12 assure a stepless configuration of the internal surfaces of the clamp structure, if needed, as described in my prior U.S. Pat. Nos. 4,299,012 and 4,315,348.

The mechanical connection generally designated by reference numeral 20 (FIG. 4B) of the originally open clamp includes at least one cold-deformed support hook 21 pressed-out of the inner band portion and providing a force abutment surface 22 extending essentially transversely to the longitudinal direction of the band as described also more fully in my prior U.S. Pat. No. 4,299,012. It is, of course, understood that in lieu of only one support hook, two or more such support hooks may be used either by themselves or in conjunction with a combined guide and support hook as disclosed, for example, in my prior U.S. Pat. No. 4,492,004. The end surface 24 (FIGS. 1 and 3) of a rectangular aperture 25 is thereby intended to abut with the abutment surfaces 22 when the clamp is in its installed condition. A small projection 26 located substantially in the center of the side 24 of the aperture 25 thereby acts as guide and centering means for engagement of the overlapping band portions and as additional locking means to prevent disengagement.

To permit tightening of the earless clamp, the outer band portion is provided with a cold-deformed embossment generally designated by reference numeral 30 which is pressed out of the outer band portion so as to form a tunnel-like opening of at least partially cylindrical shape extending in the longitudinal direction of the clamp structure and provided with tool-engaging surfaces 31 at its inner end, i.e., away from the free end of the outer band portion. The embossment 30 may thereby be similar to the embossment 24 as shown in my prior U.S. Pat. No. 4,492,004. However, in contrast to the last-mentioned patent, the inner tool-engaging surfaces 33 are formed by two pressed-out tab-like members generally designated by reference numeral 32 extending in the longitudinal direction of the clamp structure whose end surfaces 33 away from the tongue-like extension 11 constitute the tool-engaging surfaces. The two tab-like members 32 are thereby spaced from one another a distance preferably slightly smaller than the width of the aperture 25 to facilitate assembly of the clamp structure. These tab-like members 32 are thereby at least approximately symmetrically spaced with respect to the longitudinal center of the clamping band so that nearly equal amounts of band material are left between a respective opening and the corresponding longitudinal side of the band. The tab-like members 32 are of approximately triangular shape as viewed in the axial direction of the clamp structure. However, they may also be of any other suitable shape which satisfies the requirements for withstanding the tightening forces and facilitates manufacture thereof.

During assembly, the clamp is placed about a hose 42 mounted on a nipple 43 (FIG. 4A) and a tightening tool indicated in dash line in FIG. 4A is applied to the tool-engaging surfaces 31 and 33 to tighten the clamp about the hose until the small protrusion 22 engages underneath the cold-deformed support hook 21. The tools which can be used for tightening and installing the clamp of this invention may be conventional pliers or pincers commercially available at relatively low cost, thereby dispensing with the need for special tools.

FIGS. 5 and 6 illustrate a modified clamp structure in accordance with the present invention in which the embossment 30 of FIGS. 1 through 3 is replaced by two tab-like members generally designated by reference numeral 130 which are similar to the tab-like members 32 and are provided with tool-engaging surfaces 131. As to the rest, the clamp structure of FIGS. 5 and 6 is similar to that of FIGS. 1–3.

The clamp structures of this invention additionally offer the advantage that the clamps are re-usable, i.e., can be disassembled again without destruction by the use of the same tools.

While I have shown and described only two embodiments in accordance with the present invention, it is understood that the same is not limited thereto but is susceptible of numerous changes and modifications. For example, in lieu of fastening a plastic hose onto a relatively fixed part, the present invention may also be used with a pipe coupling as disclosed in my Canadian Pat. No. 1,064,544, if, instead of a flat band, a band of approximately U-shaped configuration is used, for example, if the flat band of FIGS. 1 to 3 is additionally provided along its side with edge portions extending at the desired length and predetermined angle to the flat band part. Accordingly, I do not wish to be limited to the details shown and described herein but intend to cover all such changes and modifications as are encompassed by the scope of the appended claims.

I claim:

1. An earless clamp structure whose open ends are adapted to be mechanically interconnected, comprising clamping band means provided near its free ends with mechanical interconnecting means for mechanically interconnecting the free ends when the clamp structure is at least approximately in the installed condition, said mechanical interconnecting means including at least one cold-deformed support hook means pressed-out of the clamping band means near one end thereof and aperture means near the other end of the band means, said support hook means having abutment surface means operable to engage with the side of said aperture means extending transversely to the longitudinal direction of said band means and nearer the other end of said band means, and two further means in said band means each including tool-engaging surface means extending substantially transversely to said longitudinal direction for engagement with a clamp-tightening tool, one of said further means being located intermediate said support hook means and said one end and being in the form of substantially longitudinally extending tab-like means pressed-out of the band material of the band means and provided with said tool-engaging surface means on the side of said tab-like means opposite said one end, the other further means being located in the area of the side of said aperture means opposite said first-mentioned side, and said tab-like means being of such shape and so located in said band means as to be able to extend through said aperture means with movability in the circumferential direction to enable tightening of the clamp structure by applying mutually oppositely directed tightening forces at said tool-engaging surface means until said support hook means is able to engage with its abutment surface means at said side of the aperture means.

2. A clamp structure according to claim 1, wherein said tab-like means include two tab-like members which are spaced from each other in the transverse direction by a distance at most approximately equal to the width of said aperture means.

3. A clamp structure according to claim 1, further comprising further means for effectively eliminating any steps or discontinuities in the eventual area of overlap including a tongue-like extension at said one end and a tongue-receiving means formmed at least in part by an outwardly directed step in the band means.

4. A clamp structure according to claim 2, wherein the other further means is formed by a cold-deformed embossment means pressed-out of the band means and having a tool-engaging surface means on the side thereof opposite said other end.

5. A clamp structure according to claim 2, wherein the other further means are also formed by further tab-like means pressed-out of the band material near the other side of said aperture means.

6. A clamp structure according to claim 5, wherein said further tab-like means are substantially longitudinally extending tab-like members pressed-out of the band material approximately in extension of the longitudinal sides of said aperture means.

7. A clamp structure according to claim 1, wherein the one side of said aperture means is provided with a small projection extending away from said other end and operable to engage in the opening formed underneath the pressed-out support hook means so as to serve as guide and centering means.

8. A clamp structure according to claim 7, wherein said tab-like means include two tab-like members which are spaced from each other in the transverse direction by a distance at most approximately equal to the width of said aperture means, wherein said tab-like members are so pressed out of the band material that the openings left thereby are located between a respective tab-like member and the corresponding longitudinal side of the band means, and wherein said tab-like members are located at least approximately symmetrically with respect to the longitudinal center of the clamping band means so that at least nearly identical amounts of band material are left between a respective opening and the corresponding longitudinal side of the band means.

9. A clamp structure according to claim 8, wherein the other further means is formed by a cold-deformed embossment means pressed-out of the band means and having a tool-engaging surface means on the side thereof opposite said other end.

10. A clamp structure according to claim 8, wherein the other further means are also formed by further tab-like means pressed-out of the band material near the other side of said aperture means.

11. An earless clamp structure whose open ends are adapted to be mechanically interconnected, comprising clamping band means provided near its free end with mechanical interconnecting means for mechanically interconnecting the free ends in the installed condition, said mechanical interconnecting means including at least one cold-deformed support hook means pressed-out of the clamping band means near one end thereof and aperture means near the other end of the band means, said support hook means having abutment surface means operable to engage with the side of said aperture means extending transversely to the longitudinal direction of said band means and nearer the other end of said band means, and two further means in said band means including tool-engaging surface means extending substantially transversely to said longitudinal direction for engagement with a clamp-tightening tool, one of said further means being located intermediate said support hook means and said one end and being in the form of substantially longitudinally extending tab-like means pressed-out of the band material of the band means and provided with said tool-engaging surface means on the side of said tab-like means opposite said one end, the other further means being located in the area of the side of said aperture means opposite said first-mentioned side, and said tab-like means being of such shape and so located in said band means as to be able to extend through said aperture means when the clamping band means is ultimately deformed into a circularly shaped clamp with its inner and outer band portion overlapping one another, said tab-like means including two tab-like members which are spaced from each other in the transverse direction by a distance at most approximately equal to the width of said aperture means, and said tab-like members being so pressed out of the band material that the openings left thereby are located between a respective tab-like member and the corresponding longitudinal side of the band means.

12. A clamp structure according to claim 11, wherein said tab-like members are located at least approximately symmetrically with respect to the longitudinal center of the clamping band means so that at least nearly identical amounts of band material are left between a respective opening and the corresponding longitudinal side of the band means.

13. A clamp structure according to claim 12, wherein the spacing between said tab-like members is less than the width of said aperture means.

14. A clamp structure according to claim 11, wherein said tab-like members are of approximately triangular shape as viewed in the axial direction of the clamp structure.

15. A clamp structure according to claim 14, wherein the other further means is formed by a cold-deformed embossment means pressed-out of the band means and having a tool-engaging surface means on the side thereof opposite said other end.

16. A clamp structure according to claim 15, wherein said embossment means is of at least approximately partially circular shape as viewed in transverse cross section.

17. A clamp structure according to claim 14, wherein the other further means are also formed by further tab-like means pressed-out of the band material near the other side of said aperture means.

18. A clamp structure according to claim 17, wherein said further tab-like means are substantially longitudinally extending tab-like members pressed-out of the band material approximately in extension of the longitudinal sides of said aperture means.

19. A clamp structure according to claim 14, wherein the one side of said aperture means is provided with a small projection extending away from said other end and operable to engage in the opening formed underneath the pressed-out support hook means so as to serve as guide and centering means.

20. An earless clamp structure whose open ends are adapted to be mechanically interconnected, comprising clamping band means provided near its free ends with mechanical interconnecting means for mechanically securely interconnecting the free ends when the clamp structure is at least approximately in the installed condition, said mechanical interconnecting means including at least one hook means near one end of the clamping band means and aperture means near the other end of the band means, and two tool-engaging surface means in said band means extending substantially transversely to its longitudinal direction for engagement with a clamp-tightening tool, one of said tool-engaging surface means being located intermediate said hook means and said one end and being in the form of substantially longitudinally extending tab-like means pressed-out of the band material of the band means and provided with said tool-engaging surface means on the side of said tab-like means opposite said one end, the other tool-engaging surface means being located in the area of the side of said aperture means opposite said first-mentioned side, and said tab-like means being of such shape and so located in said band means as to be able to extend through said aperture means with movability in the circumferential direction to enable tightening of the clamp structure by applying mutually oppositely directed tightening forces at said tool-engaging surface means until said support hook means is able to engage in the aperture means when the clamp structure nears its installed condition.

21. In an earless clamp structure whose open ends are adapted to be mechanically interconnected, and which includes clamping band means provided near its free ends with mechanical interconnecting means for mechanically securely interconnecting the free ends when the clamp structure is at least approximately in the installed condition, and two further means in said band means each including tool-engaging surface means extending substantially transversely to the longitudinal direction for engagement with a clamp-tightening tool, the improvement wherein one of said further means is located intermediate a part of the mechanically interconnecting means and one end of the clamping band means, the one further means being in the form of substantially longitudinally extending tab-like means pressed-out of the band material of the band means and provided with said tool-engaging surface means on the side of said tab-like means opposite said one end, wherein the other further means is located in the area of said aperture means opposite the other end of said clamping band means, and wherein said tab-like means is of such shape and so located in said band means as to be able to extend through said aperture means with movability in the circumferential direction to enable tightening of the clamp structure by applying mutually oppositely directed tightening forces at said tool-engaging surface means until said mechanical interconnecting means is able to establish a mechanical connection when the clamp structure nears its installed condition.

* * * * *